Figure 2:
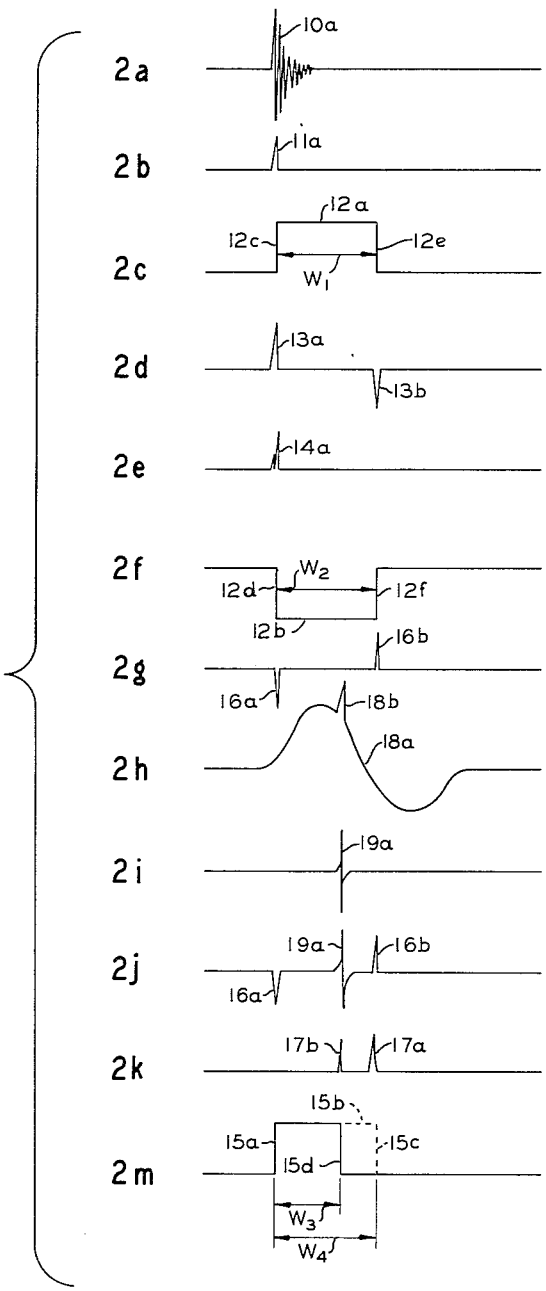

Aug. 23, 1955     K. A. McCOLLOM ET AL     2,715,832
ENGINE ANALYZER
Filed April 19, 1951     2 Sheets-Sheet 1
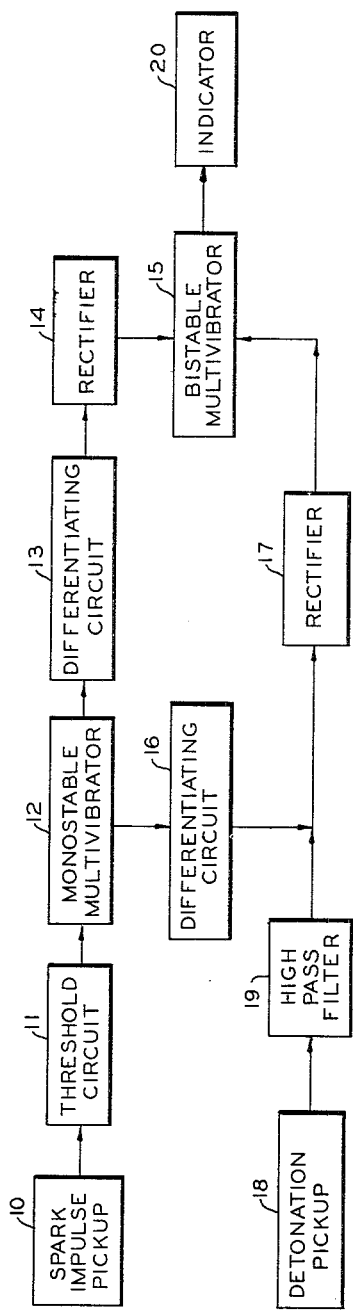
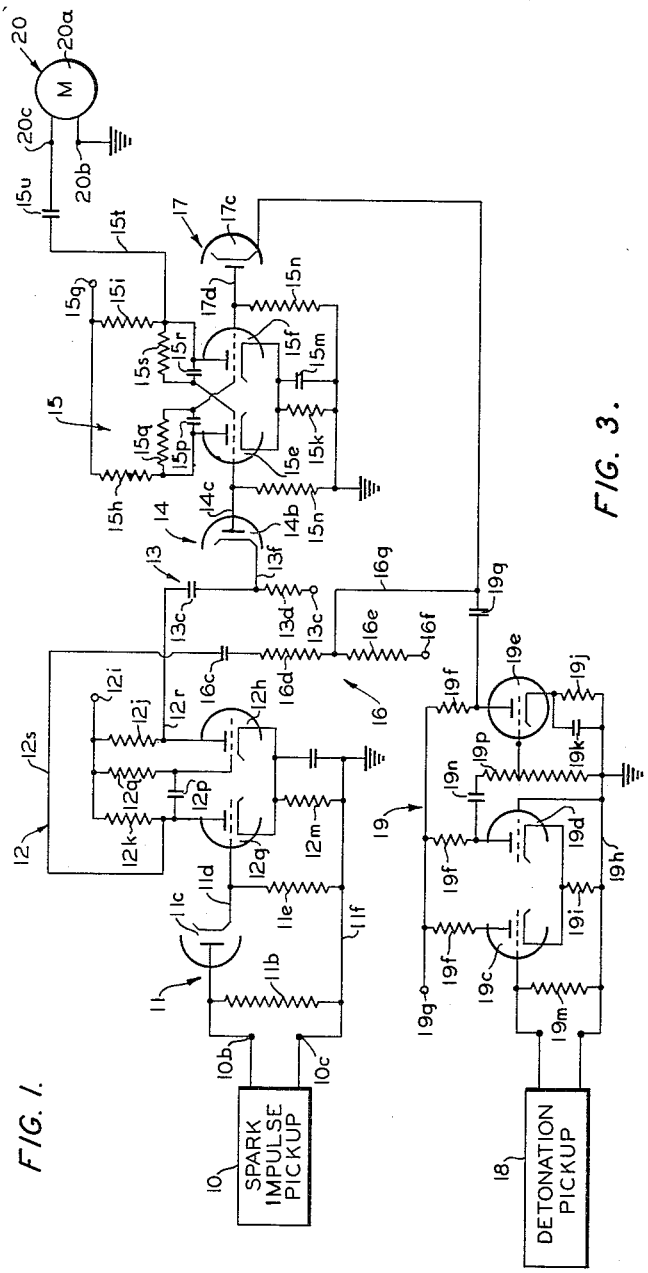
INVENTORS.
K. A. McCOLLOM
D. R. DE BOISBLANC
BY
*Hudson + Young*
ATTORNEYS Aug. 23, 1955     K. A. McCOLLOM ET AL     2,715,832
ENGINE ANALYZER
Filed April 19, 1951     2 Sheets-Sheet 2

INVENTORS.
K. A. McCOLLOM
D. R. DE BOISBLANC
BY
Hudson + Young
ATTORNEYS

United States Patent Office 2,715,832
Patented Aug. 23, 1955

2,715,832

ENGINE ANALYZER

Kenneth A. McCollom and Deslonde R. de Boisblanc, Bartlesville, Okla., assignors to Phillips Petroleum Company, a corporation of Delaware Application April 19, 1951, Serial No. 221,928

15 Claims. (Cl. 73—35)

This invention relates to a system for measuring the time interval between impulses of an electrical or other character. In one specific aspect, it relates to a circuit for measuring the time interval between a spark impulse and a detonation impulse occurring during a cycle of operation of an internal combustion engine.

In the copending application of Serial No. 14,877, now Patent No. 2,629,053, entitled Detonation Meter Calibrator, a timing device of the character specified is disclosed which is particularly adapted to measure the time interval between the spark impulse and detonation impulse which occurs during each cycle in an engine operated under "knocking" conditions. In this application, the spark impulse may initiate a rectangular wave which is terminated at the time of occurrence of the detonation impulse. Accordingly, the width of the rectangular wave is a measure of time interval between the spark and the occurrence of detonation. Alternatively, in accordance with the invention of the aforesaid copending application, the rectangular wave may be initiated by the detonation impulse and terminated by the spark impulse. Such a circuit provides important and useful results in testing engines wherein detonation occurs during each operating cycle.

However, in many cases, test engines are operated under conditions such that detonation does not occur during every cycle. In such a case, with the circuit of said copending application, the rectangular wave initiated by a spark impulse might continue throughout several successive cycles during which no detonation occurred, the wave being terminated only when a detonation impulse was picked up during some subsequent operating cycle. This, of course, would produce an abnormally high indication since the wave would extend and be measured continuously throughout a number of operating cycles.

In accordance with this invention, I provide a clearing pulse which is produced a predetermined time interval after occurrence of each initiating spark impulse. As a result, the rectangular wave is terminated by this clearing pulse at the end of the predetermined interval whenever it has not been previously terminated by a detonation impulse. This prevents the production of an abnormally wide rectangular wave which might extend for several operating cycles and produce an erroneous meter reading. Further, it affords a convenient procedure for calibrating the instrument in that, when no impulse is fed from the detonation pickup, a series of uniform waves is produced, each of which is initiated by the spark impulse and terminated by the clearing pulse. In the application of our circuit to detonation measurements, the clearing pulse should be produced at a time subsequent to the latest time at which detonation could occur during the operating cycle so that the detonation impulse normally terminates the rectangular wave initiated by the spark impulse.

The purview of the invention is not, of course, limited to the determination of a time interval between the occurrence of the spark impulse and the occurrence of detonation in an internal combustion engine. Thus, the circuit is particularly useful in conjunction with any system wherein two sets of cyclically recurring impulses are produced, the impulses of the two sets normally alternating with each other and wherein, during abnormal cycles, an impulse of one set is not produced.

It is an object of the invention to provide an improved instrument for the measurement of time intervals.

It is a further object to provide an improved circuit for measuring the time interval between the spark impulse and a detonation wave occurring during a cycle of operation of an internal combustion engine.

It is a still further object to provide such a circuit in which the reading of the instrument is not unduly affected when no detonation occurs during one or a plurality of the engine operating cycles.

Various other objects, advantages and features of the invention will become apparent from the following detailed description taken in conjunction with the accompanying drawings, in which:

Figure 1 is a block diagram of the apparatus, as applied to analyzing the behavior of an internal combustion engine;

Figures 2a and 2m, inclusive, are graphs illustrating the wave forms at various parts of the circuit of Figure 1; and Figure 3 is a schematic diagram of a circuit constructed in accordance with the block diagram of Figure 1.

Referring now to Figure 1, a pickup 10 is suitably connected in the ignition system of an internal combustion engine so as to produce an electric pulse each time the spark plug of the cylinder under test is fired. As shown by Figure 2a, the impulse produced by pickup 10 is a wave 10a of damped sinusoidal wave form. This impulse is fed through a threshold circuit 11 which transforms it into a sharp electric pulse 11a, Figure 2b. This pulse is fed to a monostable multivibrator 12 which produces a rectangular wave 12a at one portion of its circuit and a rectangular wave 12b at another portion of the circuit, the waves 12a, 12b being of similar form but opposite polarity. Thus, when a pulse 11a is fed to the multivibrator 12, it produces the leading edges 12c and 12d, Figures 2c and 2f, of the rectangular waves and, after a predetermined interval, the circuit returns to its normal condition with resultant production of the trailing edges 12e and 12f. The rectangular waves 12a, 12b are, therefore, of constant width $W_1$.

Rectangular waves 12a are fed to a differentiating circuit 13 which produces a sharp positive pulse 13a at the time of occurrence of each leading edge 12c and a sharp negative pulse 13b at the time of occurrence of each trailing edge 12e. The pulses 13a, 13b are fed through a rectifier 14 which eliminates the negative pulses 13b and permits passage only of positive pulses 14a which, of course, are coincident in time with the pulses 13a, the leading edges 12c, the pulses 11a, and the initial using portion of spark impulse 10a. The pulses 14a are fed to the initiating circuit of a bistable multivibrator 15. Each pulse 14a initiates a rectangular wave 15a, Figure 2m, which continues until it is terminated by a detonation pulse or a clearing pulse in the manner hereinafter described. The pulses 11a, 13a and 14a, or any of them, may be referred to as spark or index pulses since they are produced by spark impulses 10a and are coincident in time therewith, the pulses also serving as a time index for the operation of the circuit.

The pulses 12b from monostable multivibrator 12 are fed to a differentiating circuit 16 and a rectifier 17 which are similar in circuit and operation to the differentiating circuit 13 and rectifier 14, respectively. Due to the reversed polarity of rectangular wave 12d, as compared to rectangular wave 12a, the output of differentiating circuit 16 is a negative pulse 16a corresponding to the leading edge 12d and a positive pulse 16b coincident in time with the trailing edge 12f. When the pulses 16a, 16b are fed through rectifier 17, negative pulse 16a is eliminated and only a positive pulse 17a is produced which is coincident in time with pulse 16b and the trailing edge 12f of rectangular wave 12b. The pulses 17a, which we term clearing pulses, are fed to the terminating circuit of bistable multivibrator 15 and cause termination of the rectangular wave initiated by pulse 14a unless such wave has been previously terminated by a detonation impulse in the manner hereinafter specified. Such termination of the rectangular wave is indicated by the dotted extension 15b and dotted trailing edge 15c.

In the preferred embodiment of the invention, the circuit also includes a detonation pickup 18 which produces a low pressure wave 18a representative of the rate of pressure change in the cylinder of the engine under test during normal operation. When detonation occurs, an impulse 18b is superimposed upon the wave 18a and this impulse is coincident in time with the detonation in the cylinder. The wave shown in Figure 2h is passed through a high pass filter 19 which eliminates the pressure wave 18 and provides a pulse 19a coincident in time with the detonation impulse 18b. Figure 2j represents the wave form produced by mixing the outputs of differentiating circuit 16 and filter 19. The detonation pulse 19a is rectified by unit 17 producing a rectified detonation pulse 17b which, when fed to the terminating circuit of multivibrator 15, terminates the rectangular wave initiated by leading edge 15a, thereby producing a trailing edge 15d. It will be evident that the width $W_2$ of the rectangular wave thus produced is proportional to the time interval between the spark impulse and the occurrence of detonation in the cylinder under test. These rectangular waves are fed to an indicator 20 which indicates directly the width of each rectangular wave or the average width of a number of such rectangular waves.

In accordance with the invention, if no detonation occurs in the cylinder under test, the rectangular wave 15a, 15d does not continue indefinitely until a detonation pulse occurs during some subsequent cycle. Rather, the wave is terminated at trailing edge 15c by clearing pulse 17a with the result that the accuracy of the instrument is substantially increased. Thus, the rectangular wave can have only a maximum width $W_4$ determined by the time interval between spark pulse 13a and clearing pulse 17a. If the clearing pulses were not present, the wave might continue indefinitely, thereby introducing a highly erroneous reading.

It will be further noted that, when no detonation impulses are fed to the apparatus, a series of uniform rectangular waves of width $W_4$ is produced. This permits the circuit to be readily calibrated in units of time before the detonation pulses are fed to the apparatus.

It will be apparent that the circuit just described is useful in applications other than measurement of the time interval between spark and detonation impulses in an internal combustion engine. Thus, the circuit produces a series of rectangular waves of predetermined length where the input at threshold circuit 11 consists of a set of pulses, the spacing between the pulses being greater than the time required for multivibrator 12 to produce a complete rectangular wave 12a. If a pulse is fed through rectifier 17 at any time during which a rectangular wave is being produced by multivibrator 12, the output wave will be terminated, as indicated by trailing edge 15d. Thus, where a number of sets of pulses are produced and fed alternately through circuit 11 and rectifier 17, rectangular waves of uniform width will be produced by multivibrator 15 if the spacing between adjacent pulses is of greater than a predetermined duration. If the spacing is less, the width of the output waves will be decreased proportionately, with a resultant decrease in the reading produced by indicator 20.

In Figure 3, we have shown a suitable circuit constituting one embodiment of the block diagram of Figure 1. In this circuit, the output of spark impulse pickup 10 passes through threshold circuit 11 which includes a resistance 11b shunted across output terminals 10b and 10c of pickup unit 10. A diode 11c has its anode connected to terminal 10b and its cathode connected to a lead 11d, a suitable bias being impressed upon the cathode by a resistor 11e interconnecting lead 11d and a grounded wire 11f leading to terminal 10c. Diode 11c, of course, rectifies the signals passed therethrough and, due to the cathode bias, permits passage only of signals above a predetermined amplitude.

The monostable multivibrator 12 includes two electron tubes 12g, 12h each having an anode, a cathode and a control grid. Operating potentials are applied to the anodes from a positive power supply terminal 12i by voltage dropping resistors 12j and 12k, and to the cathodes by a grounded bias resistor 12m shunted by a bypass condenser 12n. The anode of tube 12g is connected to the control grid of tube 12h by a condenser 12p, this control grid also being connected to positive power supply terminal 12i through a resistance 12q.

The constants of the circuit are such that tube 12h is normally conductive due to the positive potential applied to its control grid and tube 12g is normally non-conductive. When a positive impulse is applied to the control grid of tube 12g, as through lead 11d, tube 12g becomes conductive, thereby producing a leading edge 12c, Figure 2c, of rectangular wave 12a, charging condenser 12p, and decreasing the voltage applied to the control grid of tube 12h so that this tube becomes non-conductive. Thereupon, condenser 12p slowly discharges through resistances 12k, 12q, thereby causing the control grid of tube 12h to become more positive. When a sufficient amount of charge has leaked away, tube 12h again becomes non-conductive with the result that the trailing edge 12e, Figure 2c, of rectangular wave 12a is produced, this wave having a uniform predetermined width $W_1$ determined by the circuit constants.

A rectangular wave having the form shown in Figure 2c is withdrawn from the anode of tube 12h by a conductor 12r and passed to differentiating circuit 13 which includes a series condenser 13c and resistance 13d connected to a positive power supply terminal 13e. Differentiated pulses are withdrawn by a lead 13f connected to the junction between condenser 13c and resistance 13d for passage through rectifier 14, which consists of a diode 14b, to a lead 14c.

Rectangular waves having the form shown in Figure 2f are withdrawn from the anode of multivibrator tube 12g by a lead 12s. These waves pass through differentiating circuit 16, which includes a condenser 16c and resistors 16d and 16e, all of which are connected in series between lead 12s and a positive power supply terminal 16f. Differentiated pulses from circuit 16 are withdrawn by a lead 16g extending to the junction between the resistors 16d, 16e, the pulses being rectified by unit 17, which consists of a diode 17c, to a lead 17d.

Signals from detonation pickup 18 are passed through high pass filter 19 which includes amplifier tubes 19c, 19d and 19e connected in cascade. A positive potential is applied to the anodes of these tubes by the respective resistors 19f connected to a common positive power supply terminal 19g. The cathodes of tubes 19c, 19d are connected to grounded lead 19h through a common bias resistor 19i and the cathode of tube 19e is connected to lead 19h by a bias resistor 19j shunted by a filter condenser 19k. The circuit further includes a grid resistance 19m for tube 19c together with a filter condenser 19n and a potentiometer 19p coupling the anode of tube 19d and the control grid of tube 19e. This circuit amplifies the signals produced by pickup 18 and removes low frequency components therefrom, due to the action of the filter condensers. Amplified filtered signals pass from the anode of tube 19e through a coupling condenser 19q to the rectifier 17.

The bistable multivibrator 15 includes two electron tubes 15e and 15f each having an anode, a cathode, and a control grid. Anode potential is supplied to the tubes from a common power supply terminal 15g through resistors 15h and 15i, respectively. The cathodes of the tubes are connected to a grounded lead 15j by a common bias resistor 15k shunted by a condenser 15m. Each tube is further provided with a grid resistor 15n. The anode of tube 15e is connected to the control grid of tube 15f by a condenser 15p shunted by a resistance 15q. In similar fashion, the anode of tube 15f is connected to the control grid of tube 15e by a condenser 15r shunted by a resistance 15s.

Assuming that tube 15e is non-conductive and tube 15f is conductive, a positive pulse applied to the control grid of tube 15e will cause this tube to become conductive with the result that tube 15f becomes non-conductive. This produces the leading edge 15a of a rectangular wave at the anode of tube 15f which is connected to an output lead 15t and a coupling condenser 15u. The circuit remains in this condition until a positive pulse is applied to the control grid of tube 15f, causing this tube to become conductive and causing tube 15e to become non-conductive. When this occurs, either as a result of a detonation pulse 17b or a clearing pulse 17a being applied to the control grid of tube 15f, the rectangular wave is terminated and the trailing edge 15c or 15d, Figure 2m, is produced. It is evident that the multivibrator 15 may be considered to be a measuring device having an initiating circuit consisting of lead 14c and the control grid circuit of tube 15e together with a terminating circuit consisting of lead 17d and the control grid circuit of tube 15f since application of positive pulses to these circuits causes the initiation and termination of a rectangular wave, respectively.

The output rectangular waves are fed to indicator 20 which, in the example shown, consists of a meter 20a having one terminal 20b thereof grounded and having its other terminal 20c connected to coupling condenser 15u. Although we have shown a meter, by the term "indicator" and its derivatives in the appended claims, we intend to include a recorder, or any other suitable indicating or recording device. It will further be understood that the circuit of Figure 3 merely represents a present preferred embodiment of the block diagram of Figure 1 and that various changes and modifications can be made in the circuit without departing from the spirit and scope of the invention.

We claim:

1. Apparatus for measuring the time interval between detonation impulses and spark impulses which comprises, in combination, means for producing an electrical pulse at the time of occurrence of each spark impulse, means for producing a clearing pulse a predetermined time interval after the occurrence of each electrical pulse, means for producing a separate pulse at the time of occurrence of each detonation impulse, a bistable multivibrator including two electron tubes each having an anode, a cathode, and a control grid, means for supplying operating potentials to the electrodes of said tubes, a resistance-capacitance unit connecting the control grid of each tube to the anode circuit of the other tube, means for feeding said electrical pulses to one of said control grids whereby each such pulse initiates a rectangular wave in the multivibrator circuit, and means for feeding said clearing pulses and said separate pulses to the other control grid whereby each rectangular wave is terminated, and means connected to said multivibrator for measuring the interval of duration of the rectangular waves, whereby the intervals which are shorter than said predetermined time interval represent time intervals between detonation and spark impulses.

2. An engine analyzer which comprises, in combination, a spark impulse pickup, a threshold circuit for producing an electrical pulse at the time of occurrence of each spark impulse, a monostable multivibrator fed by said threshold circuit to produce a rectangular wave of predetermined width initiated by each electrical pulse, a differentiating circuit to produce an index pulse at the time of occurrence of the leading edge of each rectangular wave, a bistable multivibrator including two electron tubes each having a control electrode, said last-mentioned circuit being so constructed and arranged that the incidence of a pulse upon one control electrode initiates a rectangular wave, and the incidence of a pulse on the other control electrode terminates such rectangular wave, means for feeding said index pulses to said one electrode, a second differentiating circuit fed by said monostable multivibrator to produce a clearing pulse at the time of occurrence of the trailing edge of each rectangular wave produced by said monostable multivibrator, means connecting the output of said last-mentioned differentiating circuit to the other control electrode of said bistable multivibrator, a detonation pickup, a filter and threshold circuit fed by said detonation pickup to produce a pulse at the time of occurrence of each detonation in an engine under test, means for feeding said last-mentioned pulses to said other electrode of the bistable multivibrator, and means connected to said bistable multivibrator for measuring the interval of duration of such rectangular waves, whereby the intervals which are shorter than the interval between each electrical pulse and a corresponding clearing pulse represent time intervals between detonation and spark impulses.

3. An engine analyzer which comprises, in combustion, means for sensing spark impulses in a cylinder of said engine, means for sensing detonation in said cylinder, a monostable multivibrator fed by said spark sensing means to produce a rectangular wave of predetermined width initiated by each spark impulse, a differentiating circuit to produce an index pulse at the time of occurrence of the leading edge of each rectangular wave, a bistable multivibrator including two electron tubes each having a control electrode, said last-mentioned circuit being so constructed and arranged that the incidence of a pulse upon one control electrode initiates a rectangular wave, and the incidence of a pulse on the other control electrode terminates such rectangular wave, means for feeding said index pulses to said one electrode, a second differentiating circuit fed by said monostable multivibrator to produce a clearing pulse at the time of occurrence of the trailing edge of each rectangular wave produced by said monostable multivibrator, means connecting the output of said last-mentioned differentiating circuit to the other control electrode of said bistable multivibrator, means controlled by said detonation sensing means for feeding pulses to said other electrode of the bistable multivibrator each time detonation occurs in said cylinder, and means connected to said bistable multivibrator for measuring the interval of duration of such rectangular waves, whereby the intervals which are shorter than the interval between an index pulse and a corresponding clearing pulse represent time intervals between detonation and spark impulses.

4. Apparatus for determining time intervals between two sets of cyclically recurring electrical pulses which comprises, in combination, a monostable multivibrator responsive to one set of pulses for producing a rectangular wave of predetermined width initiated by each pulse of said one set, a differentiating circuit fed by said multivibrator to produce an index pulse at the time of occurrence of the leading edge of each rectangular wave, a bistable multivibrator including two electron tubes each having a control electrode, said last-mentioned circuit being so constructed and arranged that the incidence of a pulse upon one control electrode initiates a rectangular wave, and the incidence of a pulse on the other control electrode terminates such rectangular wave, means for feeding said index pulses to said one electrode, a second differentiating circuit fed by said monostable multivibrator to produce a clearing pulse at the time of occurrence of the trailing edge of each rectangular wave produced by said monostable multivibrator, means connecting the output of said last-mentioned differentiating circuit to the other control electrode of said bistable multivibrator, means for feeding said other set of pulses to said other electrode of the bistable multivibrator, and means connected to said bistable multivibrator for measuring the interval of duration of the rectangular waves produced thereby.

5. In an instrument for determining time intervals between two sets of cyclically recurring pulses wherein a pulse of one set is normally followed by a pulse of the other set but wherein no impulse of the other set occurs during certain of the cycles of operation, a multivibrator for producing a succession of rectangular waves of variable width, means responsive to each pulse of said one set and controlling the initiation of each rectangular wave by said multivibrator so that it coincides in time with said pulse, means responsive to each pulse of the other set and controlling the termination of each rectangular wave by said multivibrator so that such termination is coincident in time with such pulse, additional means for terminating each said rectangular wave independently of said pulses of the other set a predetermined time interval after it is initiated, and means for measuring the average width of said rectangular waves.

6. Apparatus of the character described which includes, in combination, a spark impulse pickup, a threshold circuit including a rectifier tube having an anode and a cathode, means for biasing said cathode to permit passage only of signals above a predetermined amplitude, a monostable multivibrator including a pair of electron tubes each having an anode, a cathode, and a control grid, a resistance-capacitance unit connecting the anode of one electron tube with the control grid of the other electron tube, means for feeding impulses from said spark impulse pickup through said rectifier tube to the control grid of said one tube, a bistable multivibrator including a first and second electron tube each having an anode, a cathode, and a control grid, a pair of resistance-capacitance units each connecting the control grid of one of said last mentioned tubes to the anode of the other one of said last-mentioned tubes, a differentiating circuit including a series condenser and a grounded resistor, means for feeding a signal from the anode of said one tube through said differentiating circuit to the control grid of said first tube, a second differentiating crcuit including a series condenser and a grounded resistor, means for feeding a signal from the anode of said other tube through said second differentiating circuit to the control grid of said second tube, a detonation pickup, means for converting the output of said detonation pickup into a pulse which occurs at the time of each detonation wave, means for feeding said pulses to the control grid of said second tube, an indicating device, and means coupling said indicating device to the anode-cathode circuit of one electron tube of said bistable multivibrator.

7. In apparatus for determining time intervals between two sets of cyclically recurring electrical pulses wherein a pulse of one set is normally followed by a pulse of the other set but wherein no pulse of the other set is produced during certain of the cycles of operation, in combination, means for producing an electric clearing pulse a predetermined time interval after the occurrence of each pulse of said one set, said predetermined time interval being greater than the maximum interval between a pulse of one set and the following pulse of the other set, a multivibrator having a control electrode for initiating the operation thereof and a control electrode for terminating the operation thereof, means for feeding the pulses of said one set to one of said control electrodes, means connected to said pulse producing means for feeding said clearing pulses and the pulses of the other set to the other control electrode, and means connected to said multivibrator for measuring the interval of duration of the rectangular waves produced thereby.

8. In apparatus for determining time intervals between two sets of cyclically recurring electrical pulses wherein a pulse of one set is normally followed by a pulse of the other set but wherein no pulse of the other set is produced during certain of the cycles of operation, in combination, means for producing an electrical pulse at the time of occurrence of each pulse of said one set, means for producing an electrical clearing pulse a predetermined time interval after the occurrence of each electrical pulse, said time interval being greater than the maximum period between a pulse of one set and the following pulse of the other set, means for producing a separate electric pulse at the time of occurrence of each pulse of said other set, a bistable multivibrator including two electron tubes each having an anode, a cathode, and a control grid, means for supplying operating potentials to the electrodes of said tubes, a resistance-capacitance unit connecting the control grid of each tube to the anode circuit of the other tube, means connected to said electrical pulse producing means for feeding said electrical pulses to one of said control grids whereby each such pulse initiates a rectangular wave in the multivibrator circuit, and means connected to said clearing pulse producing means and said separate pulse producing means for feeding said clearing pulses and said separate pulses to the other control grid whereby each rectangular wave is terminated, and means connected to said multivibrator for measuring the interval of duration of the rectangular waves produced thereby.

9. An engine analyzer which comprises, in combination, an impulse pickup, a threshold circuit for producing an electrical pulse at the time of occurrence of each impulse, a monostable multivibrator fed by said threshold circuit to produce a rectangular wave of predetermined width initiated by each electrical pulse, a differentiating circuit to produce an index pulse at the time of occurrence of the leading edge of each rectangular wave, a bistable multivibrator including two electron tubes each having a control electrode, said last-mentioned circuit being so constructed and arranged that the incidence of a pulse upon one control electrode initiates a rectangular wave, and the incidence of a pulse on the other control electrode terminates such rectangular wave, means for feeding said index pulses to said one electrode, a second differentiating circuit fed by said monostable multivibrator to produce a pulse at the time of occurrence of the trailing edge of each rectangular wave produced by said monostable multivibrator, means connecting the output of said last-mentioned differentiating circuit to the other control electrode of said bistable multivibrator, a detonation pickup, a filter and threshold circuit fed by said detonation pickup to produce a pulse at the time of occurrence of each detonation in an engine under test, means for feeding said last-mentioned pulses to said other electrode of the bistable multivibrator and means connected to said bistable multivibrator for measuring the interval of duration of the rectangular waves produced thereby.

10. An engine analyzer which comprises, in combination, means for sensing impulses in a cylinder of said engine, means for sensing detonation in said cylinder, a monostable multivibrator fed by said sensing means to produce a rectangular wave of predetermined width initiated by each impulse, a differentiating circuit to produce an index pulse at the time of occurrence of the leading edge of each rectangular wave, a bistable multivibrator including two electron tubes each having a control electrode, said last-mentioned circuit being so constructed and arranged that the incidence of a pulse upon one control electrode initiates a rectangular wave, and the incidence of a pulse on the other control electrode terminates such rectangular wave, means for feeding said index pulses to said one electrode, a second differentiating circuit fed by said monostable multivibrator to produce a pulse at the time of occurrence of the trailing edge of each rectangular wave produced by said monostable multivibrator, means connecting the output of said last-mentioned differentiating circuit to the other control electrode of said bistable multivibrator, means controlled by said detonation sensing means for feeding pulses to said other electrode of the bistable multivibrator each time detonation occurs in said cylinder and means connected to said bistable multivibrator for measuring the interval of duration of the rectangular waves produced thereby.

11. In an instrument for analyzing the behavior of cyclically operating internal combustion engines wherein a spark impulse is normally followed by a detonation wave but wherein no detonation occurs during certain of the cycles of operation, means for sensing spark impulses, means for sensing detonation, a rectangular wave generator, means responsive to said spark impulse sensing means and operatively connected to said generator to initiate a rectangular wave at the time of occurrence of each spark impulse, means fed by said detonation sensing means and operatively connected to said generator to terminate such rectangular waves at the time of occurrence of a detonation impulse, additional means for terminating such rectangular waves independently of said last-mentioned means a predetermined time interval after initiation of the rectangular waves, and means coupled to said generator to measure the average interval of duration of the rectangular waves.

12. Apparatus for use with a system wherein two sets of cyclically recurring impulses are produced, the impulses of the two sets normally alternating with each other, and wherein, during abnormal cycles, an impulse of one set is not produced, which comprises, in combination, means for sensing the impulses of one set, means for sensing the impulses of the other set, means fed by said last-named means to produce an electrical pulse at the time of occurrence of each impulse of said other set, means fed by said last-mentioned means to produce an electric clearing pulse a predetermined time interval after the occurrence of each electrical pulse, means connected to said means for sensing the impulses of one set to produce a separate electric pulse at the time of occurrence of each impulse of said one set, a rectangular wave generator having a first control electrode for initiating the operation thereof and a second control electrode for terminating the operation thereof, means operatively connected to one of said control electrodes and to said electrical pulse-producing means to feed said electrical pulses to said one control electrode, means connected to the other control electrode and said separate electrical pulse-producing means to feed separate pulses to said other control electrode, means connected to said other control electrode and said clearing pulse-producing means to feed said clearing pulses to said other electrode, and means connected to said generator for measuring the interval of duration of the rectangular waves produced thereby.

13. Apparatus for measuring the time interval between detonation and spark impulses which comprises, in combination, means for sensing detonation, means for sensing spark impulses, means connected to said spark impulse sensing means to produce a clearing impulse a predetermined interval after the occurrence of each spark impulse, a rectangular wave generator having a control unit for initiating the operation thereof and a control unit for terminating the operation thereof, means connected to said spark impulse sensing means to feed spark impulses to one of said units, means connected to said detonation sensing means to feed signals representative of detonation to the other of said units, means connected to said clearing impulse producing means to apply said clearing pulses to said other unit, and means connected to said generator for measuring interval of duration of the rectangular waves produced thereby.

14. Apparatus for measuring the time interval between detonation impulses and spark impulses which comprises, in combination, means for producing an electrical pulse at the time of occurrence of each spark impulse, means connected to said electrical pulse-producing means for producing an electric clearing pulse a predetermined time interval after the occurrence of each electrical pulse, means for producing a separate electric pulse at the time of occurrence of each detonation impulse, a multivibrator having a control electrode for initiating the operation thereof and a control electrode for terminating the operation thereof, means connected to said electrical pulse-producing means for feeding said electrical pulses to said initiating electrode, means connected to said separate pulse-producing means and said clearing pulse-producing means for feeding said separate pulses and said clearing pulses to said terminating electrode, and means connected to said multivibrator for measuring the average interval of duration of the rectangular waves produced thereby.

15. In apparatus for determining time intervals between two sets of cyclically recurring electrical pulses wherein a pulse of one set is normally followed by a pulse of the other set but wherein no pulse of the other set is produced during certain of the cycles of operation, in combination, means for producing an electric clearing pulse a predetermined time interval after the occurrence of each pulse of said one set, said predetermined time interval being greater than the maximum interval between a pulse of one set and the following pulse of the other set, a wave generator embodying wave initiation control means and wave termination control means, means connected to said producing means and one of said control means for feeding said clearing pulses to said one control means, means connected to said one control means for feeding the pulses of said one set to said one control means, means connected to said other control means for feeding pulses of the other set to said other control means, and means connected to said generator for measuring the interval of duration of the waves produced thereby.

References Cited in the file of this patent

UNITED STATES PATENTS

| | | |
|---|---|---|
| 2,225,381 | Van Dijck | Dec. 17, 1940 |
| 2,403,527 | Hershberger | July 9, 1946 |
| 2,412,111 | Wilson | Dec. 3, 1946 |
| 2,421,018 | De Rosa | May 27, 1947 |
| 2,428,799 | Hayes et al. | Oct. 14, 1947 |
| 2,555,999 | Ringlee | June 5, 1951 |
| 2,563,879 | Soukaras | Aug. 14, 1951 |

FOREIGN PATENTS

| | | |
|---|---|---|
| 593,151 | Great Britain | Oct. 9, 1947 |